May 29, 1956 — B. McMILLAN — 2,748,201
MULTIPLE-FEEDBACK SYSTEMS
Filed Sept. 21, 1951 — 7 Sheets-Sheet 1

INVENTOR
B. McMILLAN
BY N. D. Ewing
ATTORNEY

May 29, 1956　　　　　B. McMILLAN　　　　　2,748,201
MULTIPLE-FEEDBACK SYSTEMS
Filed Sept. 21, 1951　　　　　　　　　　　　　7 Sheets-Sheet 2

INVENTOR
B. McMILLAN
BY N. S. Ewing
ATTORNEY

May 29, 1956

B. McMILLAN 2,748,201

MULTIPLE-FEEDBACK SYSTEMS

Filed Sept. 21, 1951

INVENTOR
B. McMILLAN
BY
N. A. Ewing
ATTORNEY

INVENTOR
B. McMILLAN
BY
N. D. Ewing
ATTORNEY

May 29, 1956  B. McMILLAN  2,748,201
MULTIPLE-FEEDBACK SYSTEMS
Filed Sept. 21, 1951  7 Sheets-Sheet 5

INVENTOR
B. McMILLAN
BY N. S. Ewing
ATTORNEY

May 29, 1956  B. McMILLAN  2,748,201
MULTIPLE-FEEDBACK SYSTEMS
Filed Sept. 21, 1951  7 Sheets-Sheet 6

INVENTOR
B. McMILLAN
BY
N. D. Ewing
ATTORNEY

United States Patent Office 2,748,201
Patented May 29, 1956

2,748,201
MULTIPLE-FEEDBACK SYSTEMS

Brockway McMillan, Summit, N. J., assignor to Bell Telephone Laboratories, Incorporated, New York N. Y., a corporation of New York Application September 21, 1951, Serial No. 247,699

22 Claims. (Cl. 179—171)

This invention relates to wave translating systems, including particularly electric wave amplifying systems in which feedback is employed.

In a wave translating system in which an amplifying element is included it is known that various useful effects can be secured by feeding the amplified waves back to the input of the amplifying element in one way or another. For example, negative feedback may be applied to an electric wave amplifier to reduce distortion of the waves being amplified, to reduce noise originating within the amplifier, and to stabilize the gain of the amplifier against variations in the amplifying elements or in the operating voltages applied thereto. These and other effects are achieved in proportion to the amount of feedback $\beta$ although at the cost of added circuit complexity, of course. In principle an indefinitely large amount of feedback can be obtained if the gain $\mu$ of the amplifying element be increased indefinitely, but any such increase in $\mu$ enlarges the frequency range over which one must accurately control the phase of $\beta$ if the amplifier is not to oscillate at any frequency. This very practical difficulty in circuit implementation is particularly acute in the design of high quality amplifiers that are required to operate with high gain over a wide band of frequencies, such as base band or video amplifiers for television systems and repeater amplifiers for multiplex carrier telephone and television systems.

One object of the present invention is to achieve the effect of an amount of feedback many times greater than what can be achieved practically with present techniques, or alternatively to simplify the design and construction of systems in which the effect of a given amount of feedback is required.

In electric wave amplifying systems embodying the present invention and to be described in detail hereinafter, a pair of wave translating channels, each including a respective amplifying element $\mu_1$, $\mu_2$, are connected in multiple between a common signal input circuit, or "source," and a common signal output circuit, or "load." Feedback paths are provided such that (a) the two amplifying elements are incorporated as the $\mu$-elements of respectively corresponding negative feedback amplifiers the $\mu\beta$ loops of which are independent of each other, and (b) the wave output of one of the amplifiers is fed back in approximately signal-cancelling relation to the input of the second. The first amplifier may be regarded as the main signal amplifier, and the second as an auxiliary or secondary amplifier the wave input and wave output of which consist largely of distortion products and other spurious effects derived from the output of the main amplifier. The spurious effects translated through the secondary amplifier are combined in approximately cancelling relation with those appearing in the output of the main amplifier thus leaving the amplified signal that is delivered to the load relatively free of such effects. The secondary amplifier itself adds but little to such residue of spurious effects as may appear in the output of the system for it is only lightly loaded and such effects as it does introduce are substantially reduced by feedback.

In accordance with a feature of the invention the respective feedback transmissions, $\beta_1$ and $\beta_2$, in the two amplifiers are made equal to each other and to the "cross feedback" transmission $\beta_{12}$ from the output of the one amplifier to the input of the other.

In accordance with a further feature the two amplifiers are made alike in all respects, including $\mu$, $\beta$ and signal power capacity, whereby in the event of failure of the main amplifying element the secondary amplifier automatically assumes the load and provides uninterrupted feedback-stabilized operation. If $\mu\beta$ be large enough the overall gain of the system is reduced in such event by only a negligible amount.

Other features of the invention reside in circuit configurations in which the circuit elements that determine one of the feedback transmissions, $\beta_1$ and $\beta_2$, serve also to determine the cross feedback transmission $\beta_{12}$. By virtue of these features one can not only save the cost and complication of a third feedback network but also insure exact equality of $\beta_{12}$ and at least one of $\beta_1$ and $\beta_2$.

In accordance with still another feature of the invention one or more additional amplifying elements may be connected in multiple with the first pair and additional feedback paths provided such that in general the system enjoys the advantages of feedback equivalent to N times the amount of feedback, in decibels, provided for any one of the amplifying elements, where N is the total number of amplifying elements or channels.

These and other objects, features and advantages of the invention will appear more fully on consideration of the various embodiments illustrated in the accompanying drawing and now to be described.

Figure 1:
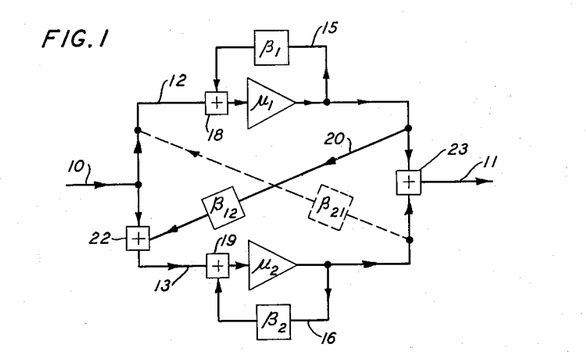
Figs. 1 to 3 are diagrammatic representations of two-channel systems embodying the invention.

Referring now to the idealized prototype shown diagrammatically in Fig. 1 two amplifying elements $\mu_1$ and $\mu_2$ are shown interposed in respective transmission branches or channels 12 and 13 that are connected in multiple with each other between a common signal input circuit 10 and a common signal output circuit 11. Each of the amplifying elements is embraced by a feedback path 15, 16, the transmission characteristic of which is represented by $\beta_1$ and $\beta_2$, respectively. A third or cross feedback path 20 of transmission characteristic $\beta_{12}$ extends from the output of element $\mu_1$ to the input of element $\mu_2$. In the various branches of the Fig. 1 system waves are assumed to be transmitted only in the directions indicated by the arrows. Junction devices or "adders" represented at certain of the circuit junctions in Fig. 1 indicate that the outgoing branch at each such point carries the sum of the waves on the two incoming branches, and that there is conjugacy between certain of the branches as indicated by the arrows. Thus at junction 18 in channel 12 waves flow to the input of amplifying element $\mu_1$ from both the common input circuit 10 and feedback path 15 but the waves fed back to that point are prevented, by conjugacy at 18, from reaching the other channel 13 or, more especially, the input of element $\mu_2$. A similar provision is made at junction 19 at the input of element $\mu_2$. At junction 22 the waves from feedback path 20 are prevented, by conjugacy, from entering channel 12 but pass freely with the signals from common input circuit 10 to the input of element $\mu_2$. At junction 23 the wave output of each channel is delivered to the common output circuit 11 but is prevented, by conjugacy, from entering the feedback path individual to the other channel.

With regard to phase relations in Fig. 1 it may be understood that the two feedback paths $\beta_1$ and $\beta_2$ provide negative feedback around their respective associated amplifying elements, that the phase shifts from source to load through channels 12 and 13, respectively, are equal to each other, and that the feedback over path 20 is so phased as to oppose the applied signal. It may be understood further that over the frequency range occupied by the signals to be amplified $\mu_1\beta_1 \gg 1$ and that likewise $\mu_2\beta_2 \gg 1$, so that the gain characteristic of each of the amplifying elements with feedback is approximately $1/\beta$ and varies in magnitude and phase over the frequency range in the same manner as $1/\beta$.

In Fig. 1 then, the three feedback paths are associated with two $\mu\beta$ loops and one cross feedback connection. The two loops, as will be demonstrated shortly, are independent of each other which is to say that the stability of each of them is independent of the transmission around the other and each may be designed for stability accordingly without regard for the other. Furthermore, the manner in which the wave outputs of the two channels combine with each other depends largely on the relation between the several feedback transmissions, that is, on $\beta_1$, $\beta_2$ and $\beta_{12}$.

Equations describing the characteristics of the Fig. 1 circuit may be derived as follows. Let a signal $S$ of unit amplitude be applied to the common input circuit 10, let $N_r$ represent noise originating within the amplifying element (considered as injected at the input of $\mu_r$), where the applicable subscript $r$ for channel 12 is 1 and for channel 13 is 2, and let $M_r$ represent similarly the modulation, or non-linear distortion, produced in $\mu_r$ and appearing in the output thereof.

By inspection, the output will be of the form $$G = \gamma + a_1(M_1 + \mu_1 N_1) + a_2(M_2 + \mu_2 N_2) \quad (1)$$

where $\gamma$ represents the overall signal gain and $a_1$, $a_2$ are noise suppression factors. To compute $\gamma$ and the $a_r$, let $e_r$ represent the total input to $\mu_r$. The coupling schematic yields immediately $$e_1 = 1 + N_1 + \beta_1(M_1 + \mu_1 e_1) \quad (2)$$
$$e_2 = 1 + N_2 + \beta_{12}(M_1 + \mu_1 e_1) + \beta_2(M_2 + \mu_2 e_2) \quad (3)$$
$$G = M_1 + M_2 + \mu_1 e_1 + \mu_2 e_2 \quad (4)$$

Eliminating $e_1$ and $e_2$, $$\gamma = \frac{\mu_1}{1-\mu_1\beta_1} + \frac{\mu_2}{1-\mu_2\beta_2} + \frac{\mu_1\mu_2\beta_{12}}{(1-\mu_1\beta_1)(1-\mu_2\beta_2)} \quad (5)$$

This may be written $$\gamma = \frac{\mu_1 + \mu_2 + \mu_1\mu_2(\beta_{12}-\beta_1-\beta_2)}{(1-\mu_1\beta_1)(1-\mu_2\beta_2)} \quad (6)$$

Further, $$a_1 = \frac{1+\mu_2(\beta_{12}-\beta_2)}{(1-\mu_1\beta_1)(1-\mu_2\beta_2)} \quad (7)$$

$$a_2 = \frac{1}{1-\mu_2\beta_2} \quad (8)$$

The signal-components of the inputs to $\mu_1$ and $\mu_2$, i. e., the values of $e_1$ and $e_2$ when $N_r = M_r = 0$, are $$e_{10} = \frac{1}{(1-\mu_1\beta_1)} \quad (9)$$

$$e_{20} = \frac{1+\mu_1(\beta_{12}-\beta_1)}{(1-\mu_1\beta_1)(1-\mu_2\beta_2)} \quad (10)$$

The gain stabilization factors $1/S_r$ are defined and given by $$\frac{1}{S_1} = \frac{\partial \log \gamma}{\partial \log \mu_1} = \frac{\mu_1 + \mu_1\mu_2(\beta_{12}-\beta_2)}{(1-\mu_1\beta_1)(\mu_1+\mu_2+\mu_1\mu_2(\beta_{12}-\beta_1-\beta_2))} \quad (11)$$

$$\frac{1}{S_2} = \frac{\partial \log \gamma}{\partial \log \mu_2} = \frac{\mu_2 + \mu_1\mu_2(\beta_{12}-\beta_1)}{(1-\mu_2\beta_2)(\mu_1+\mu_2+\mu_1\mu_2(\beta_{12}-\beta_1-\beta_2))} \quad (12)$$

Finally, for comparison purposes, note that the gain $\gamma$, noise suppression $a$, signal input $e_0$, and sensitivity $S$ of an ordinary single loop amplifier are given by $$\frac{1}{\mu}\gamma = a = e_0 = \frac{1}{S} = \frac{1}{1-\mu\beta} \quad (13)$$

One ordinarily thinks of the quantity on the right as being of the order of magnitude of $$\frac{1}{\mu\beta}$$

in the pass band of the amplifier.

The table that follows includes, in column I, certain of the foregoing factors and three others. Of these three, $M_0$ and $N_0$ represent respectively the total second-order modulation products and the total "tube noise" appearing in the common output circuit, both computed relative to unit noise output from the $\mu$-circuit. The third factor, $D$, will be explained shortly.

Column II of the table gives the values for each of these factors (except D) for the general case illustrated in Fig. 1.

| I | II | III | IV | V |
|---|---|---|---|---|
| $e_{10}$ | $\dfrac{1}{1-\mu_1\beta_1}$ | $\dfrac{1}{1-\mu_1\beta}$ | $1$ | $0$ |
| $e_{20}$ | $\dfrac{1+\mu_1(\beta_{12}-\beta_1)}{(1-\mu_1\beta_1)(1-\mu_2\beta_2)}$ | $\dfrac{1}{(1-\mu_1\beta)(1-\mu_2\beta)}$ | $\dfrac{1}{1-\mu_1\beta}$ | $-20$ |
| $a_1$ | $\dfrac{1+\mu_2(\beta_{12}-\beta_2)}{(1-\mu_1\beta_1)(1-\mu_2\beta_2)}$ | $\dfrac{1}{(1-\mu_1\beta)(1-\mu_2\beta)}$ | $\dfrac{1}{1-\mu_2\beta}$ | $-20$ |
| $a_2$ | $\dfrac{1}{1-\mu_2\beta_2}$ | $\dfrac{1}{1-\mu_2\beta}$ | $1$ | $0$ |
| $\dfrac{1}{S_1}$ | $\dfrac{\mu_1+\mu_1\mu_2(\beta_{12}-\beta_2)}{(1-\mu_1\beta_1)(\mu_1+\mu_2+\mu_1\mu_2(\beta_{12}-\beta_1-\beta_2))}$ | $\dfrac{\mu_1}{(1-\mu_1\beta)(\mu_1+\mu_2-\mu_1\mu_2\beta)}$ | $\dfrac{\mu_1}{\mu_1+\mu_2-\mu_1\mu_2\beta}$ | $-20.8$ |
| $\dfrac{1}{S_2}$ | $\dfrac{\mu_2+\mu_1\mu_2(\beta_{12}-\beta_1)}{(1-\mu_2\beta_2)(\mu_1+\mu_2+\mu_1\mu_2(\beta_{12}-\beta_1-\beta_2))}$ | $\dfrac{\mu_2}{(1-\mu_2\beta)(\mu_1+\mu_2-\mu_1\mu_2\beta)}$ | $\dfrac{\mu_2}{\mu_1+\mu_2-\mu_1\mu_2\beta}$ | $-20.8$ |
| $M_0$ | $\sqrt{a_1^2+\left(\dfrac{e_{20}}{e_{10}}\right)^4 a_2^2}$ | $a_1\sqrt{1+\dfrac{(1-\mu_1\beta)^2}{(1-\mu_2\beta)^2}}$ | $\simeq\dfrac{1}{1-\mu_2\beta}\left(1+\dfrac{1}{2}\dfrac{(1-\mu_1\beta)^2}{(1-\mu_2\beta)^4}\right)$ | $-19.96$ |
| $N_0$ | $\sqrt{a_1^2+a_2^2}$ | $a_1\sqrt{1+\dfrac{1}{(1-\mu_1\beta)^2}}$ | $\simeq 1+\dfrac{1}{2(1-\mu_1\beta)^2}$ | $+0.04$ |
| $\gamma$ | $\dfrac{\mu_1+\mu_2+\mu_1\mu_2(\beta_{12}-\beta_1-\beta_2)}{(1-\mu_1\beta_1)(1-\mu_2\beta_2)}$ | $\dfrac{\mu_1+\mu_2-\mu_1\mu_2\beta}{(1-\mu_1\beta)(1-\mu_2\beta)}$ | $\dfrac{\mu_1+\mu_2-\mu_1\mu_2\beta}{\mu_1(1-\mu_2\beta)}$ | $+.82$ |
| $D$ | ---------- | $\dfrac{1}{(1-\mu_1\beta)(1-\mu_2\beta)}$ | $\dfrac{1}{1-\mu_2\beta}$ | $-20$ |

From the foregoing equations it may be observed that, independently of any special relations that may hold among $\beta_1$, $\beta_2$ and $\beta_{12}$ the over-all gain of the system is infinite only when one or both of $\mu_1\beta_1$ and $\mu_2\beta_2$ are unity. It is this that implies that the stability of the system is determined by the two separate and independent loop transmissions $\mu_1\beta_1$ and $\mu_2\beta_2$. Further, it is to be observed that when either $\mu_1$ or $\mu_2$ is zero, the over-all gain reduces to the gain of a single loop system.

Only one of the channels is ordinarily fully loaded, but it will be evident from the last observation above that if its amplifier element $\mu_1$ fails (as by reason of failure of an amplifying vacuum tube or of power supply) the cross feedback is interrupted and the other channel assumes the load. Either amplifier may therefore be regarded as a standby for the other and may be designed accordingly. That is, it may be designed to have substantially the same gain characteristic as the main amplifier and also to have the same signal power-carrying capacity.

Although only two amplifying channels are present in the Fig. 1 circuit the present invention enables the use of any greater number N of such channels with corresponding multiplication of the effective feedback of the overall system. Examples of such systems in which N is greater than 2 are illustrated diagrammatically in Figs. 4 and 5, for example. In general, the wave outputs of all of the channels are added unilaterally to form the output of the system and in the input of each of the amplifying elements $\mu_1, \mu_2 \ldots \mu_N$ the signal is combined unilaterally with a feedback. This feedback to $\mu_2$ depends linearly on the output of $\mu_1$ alone, the feedback to $\mu_3$ depends linearly on the outputs of $\mu_1$ and $\mu_2$ only, and the feedback to any other amplifying element $\mu_r$ depends linearly on the outputs of $\mu_1, \mu_2 \ldots \mu_r$.

In accordance with a feature of the invention all of the feedbacks are made substantially identically equal to each other over at least the useful transmission band, i. e., the signal frequency band. With $\mu\beta \gg 1$ in each channel, the effective gains of the respective channels are relatively insensitive to variations in their $\mu$-elements; and with the $\beta$'s equal one insures the equality of effective gains that is desired for the purposes of the invention. The characteristics of a two-channel system ($N=2$) in which $\beta_{12}=\beta_1=\beta_2=\beta$ are set forth in column III of the table, while column IV gives the ratio in which these characteristics improve upon the characteristics of a single-loop amplifier. Column V of the table tabulates the decibel values of the factors in column III for such a system in which, for specific example, each loop gain $\mu_r\beta$ is —9 and in which therefore the absolute value of $(1-\mu_r\beta)$ is 20 decibels.

Column III of the table indicates that all of the factors tabulated represent a substantial improvement over the single loop case excepting for three of them. One of the exceptions is the signal input $e_{10}$ which is the same as that in the single loop case. On the other hand $e_{20}$ is reduced by the factor $1/(1-\mu_1\beta)$ so that the $\mu_2$ amplifying element is clearly a secondary or monitoring amplifier. Second, the noise suppression factor $a_2$ is the same as in the single loop case. This means, of course, that noise generated in the $\mu_2$ channel appears in the output exactly as it would from any feedback amplifier. However, with regard to modulation noise, which is at worst proportional to the signal input, the failure of $a_2$ to be reduced by the presence of $\mu_2$ is at least compensated for by the fact that $e_{20}$ is reduced. Third, the total tube noise in the output of the two-loop system is slightly greater than that of a single amplifier. This arises from the fact that the noise generated in $\mu_1$ is reduced by the presence of $\mu_2$ to a small fraction of that in $\mu_2$, while the noise in $\mu_2$ appears in the output exactly as it would in any feedback amplifier. The sum of the two (statistically independent) noise outputs is only slightly greater than $\mu_2$ alone.

This last observation is worth phrasing a different way: It is well known that feedback does not improve the signal to noise ratio at the input grid. In the present system, however, the noise injected at the input of $\mu_1$ is suppressed, leaving the two amplifier system hardly noisier than a single unit.

With regard to total modulation output and gain stabilization, column IV shows that the two loop system improves a single loop amplifier by factors which, when $\mu_r\beta \gg 1$, take the form $$\frac{\mu\beta^k}{\mu^2\beta^{k+1}} \sim \frac{1}{\mu\beta}$$

where $k=0$ or 1. Effectively, then, the ideal two loop system has twice the feedback of a single loop amplifier, when measured by gain stabilization or modulation suppression, with the same tube noise output.

The last factor in the table is the relative discrepancy D between the actual gain $\gamma$ and its ideal value as the $\mu_r$ approaches infinity, viz., $$\frac{\gamma - (-1/\beta)}{1/\beta}$$

This discrepancy is reduced by a factor $$-\frac{1}{\mu\beta}$$

in the two loop case. Combining this information with that concerning gain stabilization, one finds that the two loop system approximates the passive network $$\frac{1}{\beta}$$

more exactly and with less dependence on the $\mu$'s, than a single loop system does.

In practice it may be difficult if not impossible in some cases to realize exact equality of the several $\beta$'s but comparison of columns II and IV of the table shows that all of the critical factors would be improved by approximately six decibels if the absolute magnitude of $\mu_r(\beta_{12}-\beta_r)$ could be maintained of the order of unity or smaller.

Figure 2:
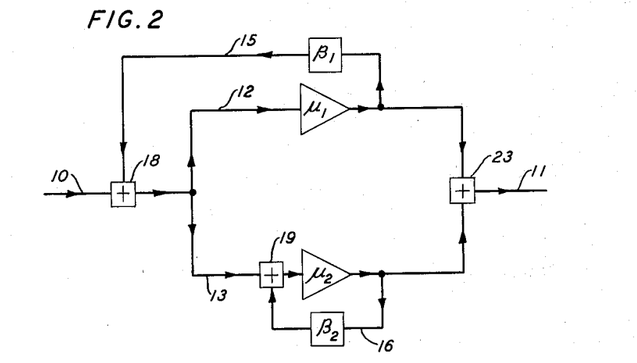
Figure 3:
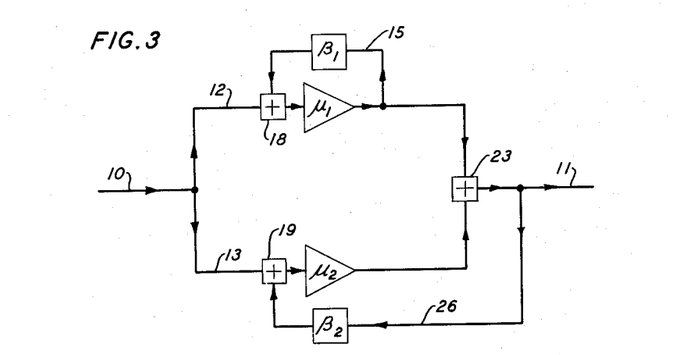

Figs. 2 and 3 represent idealized circuit configurations in accordance with the invention in which either $\beta_1$ or $\beta_2$ can be made identically equal to $\beta_{12}$ so that certain of the performance factors are certain to have their tabulated ideal values.

The system in Fig. 2 may be described briefly as being the same as the Fig. 1 system except for two changes: first, the cross feedback path 20 and junction 22 are not shown and second, the feedback connection 15 extends from the output of $\mu_1$ to a junction 18 in the common input circuit 10. The three feedback paths of Fig. 1 are nevertheless present. The feedback from the output to the input of $\mu_1$ can be traced through connection 15, junction 18 and the upper channel 12 to the input of $\mu_1$. Second, is the feedback connection 16 around $\mu_2$, which is unchanged. Third, a cross feedback path can be traced from the output of $\mu_1$ through connection 15, junction 18 and channel 13 to the input of $\mu_2$. Hence the cross feedback transmission corresponding to $\beta_{12}$ of Fig. 1 is fixed by and identically equal to $\beta_1$ in connection 15. The adder at junction 18 provides the same conjugacy that obtains in Fig. 1.

Fig. 3 may be compared likewise with Fig. 1. In this case a feedback connection 26 extends to a junction 19 at the input of $\mu_2$, as before, but from a point in the common output circuit 11 that lies beyond junction 23. The $\mu_1\beta_1$ loop is the same as in Fig. 1 and easily identified. The $\mu_2\beta_2$ loop extends from the output of $\mu_2$ through junction 23, circuit 11 and feedback connection 26 to the junction 19 at the input of $\mu_2$. The cross feedback path in Fig. 3, corresponding to 20 in Fig. 1, can be traced from the output of $\mu_1$, junction 23 and feedback connection 26 to the input of $\mu_2$. In this case the cross feedback transmission $\beta_{12}$ is fixed by and is identically equal to $\beta_2$.

In both Figs. 2 and 3 it is to be noted each of the amplifying channels is provided with its own independent feedback loop and the output of one of them is fed back to the input of the other and both thus conform with the Fig. 1 prototype.

Referring to column II of the table it will be seen that in Fig. 2 (where $\beta_{12} \equiv \beta_1$) $e_{20}$ and the gain stabilization $1/S_2$ have essentially the ideal value given in column IV independently of the value of $\beta_2$. Reduction of the noise suppression factor $a_1$ and gain stabilization $1/S_1$ of the main amplifier still require the balancing of $\beta_2$ and $\beta_1$.

Similar consideration of Fig. 3 (in which $\beta_{12} \equiv \beta_2$) reveals that $a_1$ and $1/S_1$, both of which quantities relate to the main amplifier, have essentially their ideal values independently of $\beta_1$. The balancing of $\beta_1$ and $\beta_2$ then has the effect of reducing $e_{20}$ and improving the gain stabilization of the secondary amplifier. This arrangement is highly desirable from the point of view of modulation suppression because the total modulation output is more sensitive to $a_1$ than to $e_{20}$. In Fig. 3, too, the major contributor to modulation noise, which is the main amplifier, is ideally suppressed while suppression of the secondary contributor is left to the balancing of $\beta_1$ and $\beta_2$.

Figure 4:
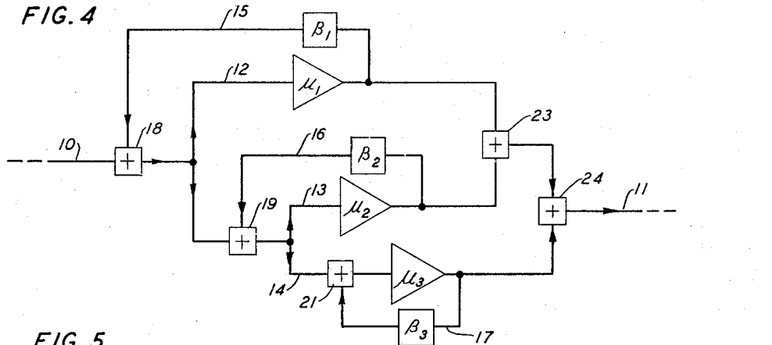
Figs. 4 and 5 are similar representations of three-channel systems.
Figure 5:
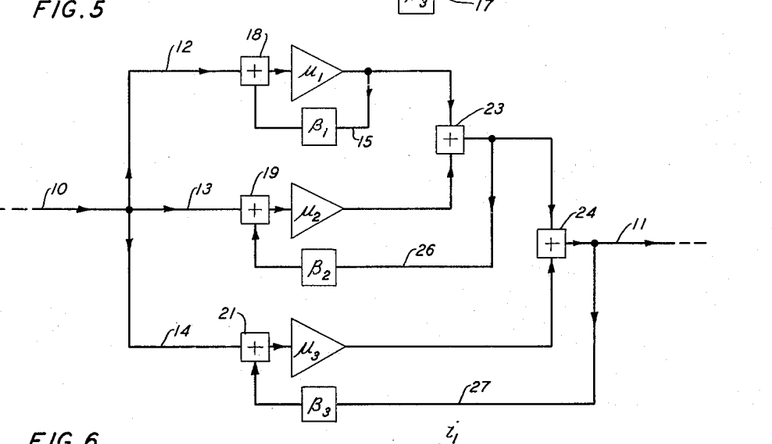

Figs. 4 and 5 are idealized representations of circuit configurations in accordance with the invention in which more than two channels, and specifically three, are employed. From these illustrations it will be apparent how any number of channels may be added not only in these figures but also in the general case represented in Fig. 1. The configuration in Fig. 4 is the same as that in Fig. 2 with the addition of an amplifying channel 14 which extends from a point in channel 13 between junction 19 and the input of $\mu_2$ to a junction 24 where it is joined in conjugate relation with the output connection from junction 23 to the common output circuit 11. Channel 14 includes amplifying element $\mu_3$ and a feedback connection 17 that extends from the output of $\mu_3$ to a junction 21 in the input circuit of $\mu_3$.

In Fig. 4 it will be evident that channels 12 and 13 are not affected by the addition of channel 14, at least in so far as concerns stability of the feedback loops associated with those two channels. Three feedback connections to the input of $\mu_3$ can be readily traced, one extending from the output of $\mu_1$ through junctions 18 and 19 to channel 14, a second from the output of $\mu_2$ and junction 19 to channel 14, and third, of course, the local or individual feedback connection $\beta_3$ from the output of $\mu_3$. Channel 12 is the main channel: the signal amplitude effective on the input of its amplifying element $\mu_1$ is reduced only by the negative feedback $\beta_1$. Channels 13 and 14 are auxiliary channels, the signal amplitude effective on the input of $\mu_2$ being the feedback-reduced signal of channel 12 further reduced by negative feedback $\beta_2$, and the input to $\mu_3$ being still further reduced by $\beta_3$.

The configuration represented in Fig. 5 is related to Fig. 3 in the same manner as Fig. 4 is related to Fig. 2. Fig. 5 is the same as Fig. 3 except for the addition of an amplifying channel 14 which branches from the common input circuit 10 and has its output combined in a junction 24 with the output from junction 23 for application to the common output circuit 11. The additional feedback connection for the third channel comprises a connection that branches from the common output circuit 11 and extends to a junction 21 in the input circuit of $\mu_3$. A feedback loop $\mu_3 \beta_3$ can be traced readily through $\mu_3$, junction 24 and connection 27 to junction 21. Feedback connection 27 provides the desired cross connection for it receives the wave output of both channels 12 and 13.

On comparing Figs. 4 and 5 it is to be observed that in Fig. 4 the several feedback paths are, at the output sides of the system, individual to the several $\mu$'s and that they combine in the prescribed manner on the input side of the system. In Fig. 5 on the other hand the individuality of the several feedback paths appears at the input side of the system and their combination in prescribed manner takes place on the output side of the system.

Figure 6:
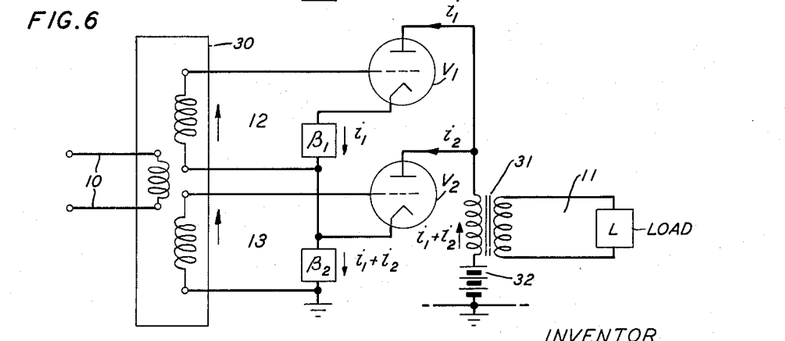
Figs. 6 to 14 are circuit diagrams illustrating specific embodiments conforming with Fig. 2 or 3, and Figs. 16 to 19 illustrate further embodiments employing hybrid connections for conjugacy.
Figure 7:
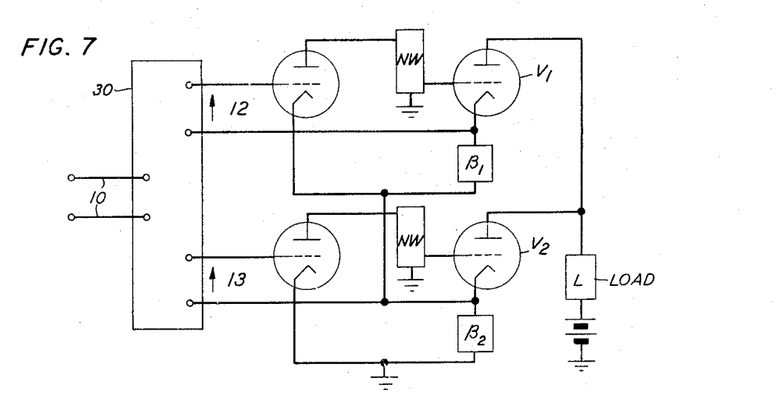
Figure 8:
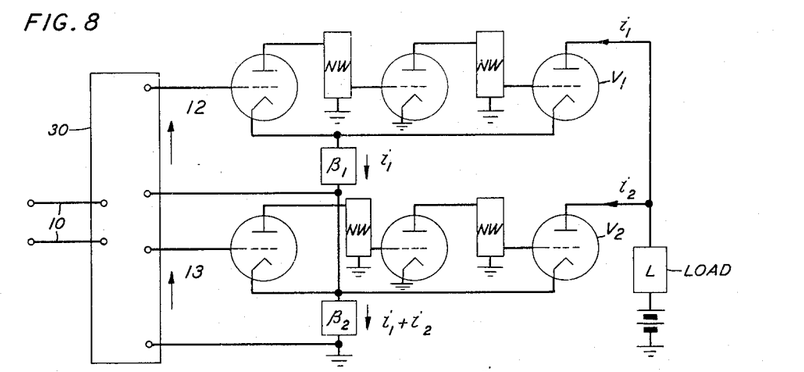

Figs. 6, 7 and 8 show physical embodiments of the invention employing one-, two- and three-stage vacuum tube amplifiers, respectively, in two-channel systems. The circuits in these and other figures of the drawing are shown schematically with much conventional detail omitted for the sake of clarity. With the exception of the anode current supply for the output stages, direct current connections are omitted and only the signal-frequency connections are shown. The vacuum tubes are represented as triodes, i. e., as having only a signal grid, whereas in practice these tubes will usually be screen grid or pentode tubes. The amplifiers in the several channels will be recognized as standard types well known in the art and can be readily designed accordingly. Many of the three-stage amplifiers shown are of the standard cathode feedback type to be found in the textbooks and in J. M. West Patent 2,227,048, December 31, 1940, for example. $\beta_1$ and $\beta_2$ will be used to designate the transmission characteristics of feedback circuits, as before, and also to designate the two-terminal feedback coupling impedances of networks that are largely, if not exclusively, responsible for those characteristics.

Referring now to Fig. 6, the two amplifying channels 12 and 13 are connected to the common input circuit 10 through respective secondary windings of an input transformer 30. The anodes of the two corresponding vacuum tubes V1 and V2 are connected together to one terminal of the primary winding of an output transformer 31, the other side of that winding being connected to ground through battery 32 which supplies space current to the two tubes. The input circuit of tube V1 includes in series therein the two terminal feedback coupling impedance $\beta_1$ and a corresponding coupling impedance $\beta_2$ is included similarly between the cathode of V2 and the input transformer. $\beta_1$ and $\beta_2$ are connected in series relation with each other between the cathode of V1 and ground, so that the output current $i_1$ of tube V1 flows through both $\beta_1$ and $\beta_2$ whereas the output current $i_2$ of V2 flows through V2 only as indicated in Fig. 6. It will be clear that $\beta_1$ provides negative feedback around V1 and that $\beta_2$ does the same for V2. $\beta_2$, however, is traversed also by the output current $i_1$ associated with the upper or main channel 12 and accordingly injects a corresponding feedback voltage in the input circuit of the lower or secondary channel. In the respects just noted, Fig. 6 conforms with Fig. 3.

The conjugacies described with reference to Fig. 3 depend, in Figs. 6 to 15, largely upon differences in power level and in impedance in various parts of the circuit. The impedance of $\beta_1$ is small compared with the input impedance of tube V1 and hence, there is little tendency for currents in $\beta_1$ to produce a current flow through its associated transformer winding which would be transferred by induction to either the input circuit 10 or channel 13. Thus the conjugacy provided at junction 18 in Fig. 3 is closely approximated. Similar consideration of the input circuit of channel 13 will show that the conjugacy provided at junction 19 in Fig. 3 is likewise closely approximated. The effect of junction 23 in Fig. 3 is realized also in Fig. 6 for if, as contemplated, the output impedance of each of the tubes is many times higher than $\beta_1$, $\beta_2$ and the load impedance, the voltage output appearing across transformer 31 can have but such slight effect on the current through V1 as to produce a negligible corresponding voltage across $\beta_1$.

The circuit illustrated in Fig. 7 is generally similar to that of Fig. 6 except that a two-stage amplifier is employed in each of the two channels. The relation of $\beta_1$, $\beta_2$ and the load to the space paths of the two output tubes V1 and V2 is the same as in Fig. 6. In this and other figures to follow the output transformer 31 on Fig. 6 is not illustrated but may be regarded as a part of the load. Assuming that there is no over-all or net phase reversal in either of the two-stage amplifiers, the cathodes in the two input stages are each connected to the low potential side of its respective $\beta$ network and the two transformer secondaries are each returned to the high potential side of the respectively corresponding $\beta$ network, i. e., to the cathodes of $\beta_1$ and $\beta_2$, respectively.

The three-stage amplifiers illustrated in Fig. 8 are both of the cathode feedback type in which the cathode in each of the intermediate stages is grounded and the cathodes of the input and and output stages are connected together in the manner shown so that $\beta_1$ and $\beta_2$ enter into the respective input circuits as they do in Fig. 6. In the two output stages $\beta_1$, $\beta_2$ the space paths of V1 and V2, and the load are all related circuit-wise as they are in Fig. 6.

In Figs. 7 and 8 there are parasitic couplings due to the fact that the plate currents of the input tubes appear in the $\beta$ networks. These parasitic couplings represent an increment to $\beta_{12}$ that depends explicitly upon the forward gain of those stages in channel 12 following the first stage, and they can be so treated in the detail design of the system. If there are an odd number of stages in each channel, as in Fig. 8, the parasitic couplings can be eliminated by employing the combination of series and cathode feedback to be described with reference to Fig. 12.

Figure 9:
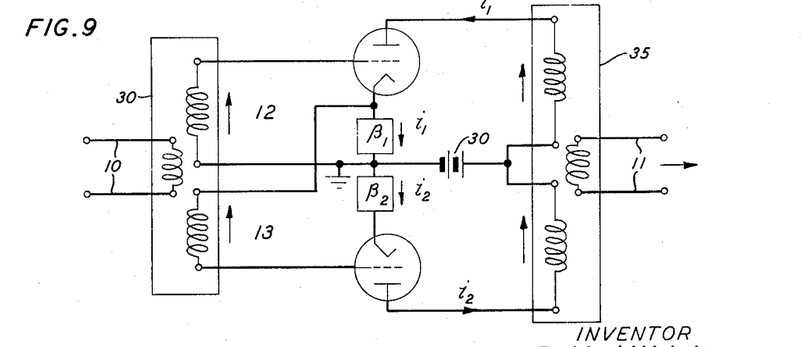
Figure 10:
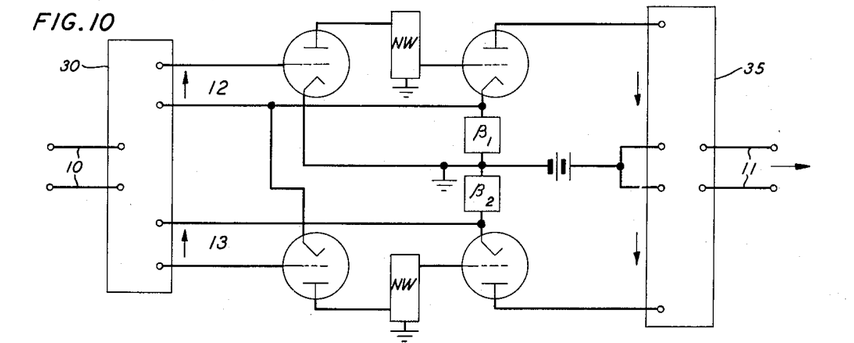
Figure 11:
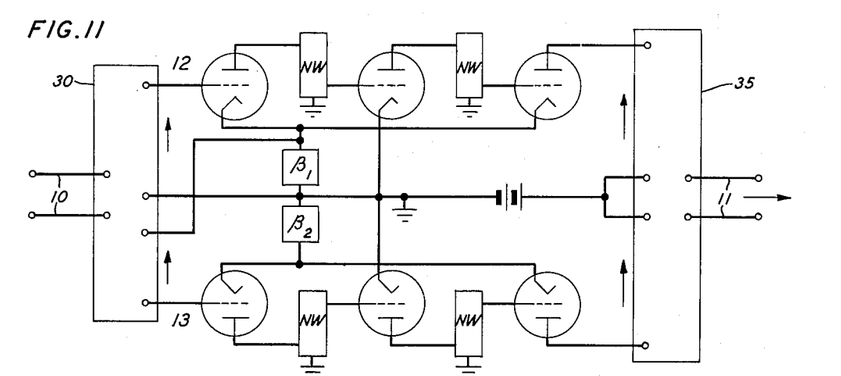

The circuits shown in Figs. 9 to 11 may be regarded as analogs of Figs. 6 to 8, respectively, in which the main and secondary channels 12 and 13 are 180 degrees out of phase. In effect, the phase of the input and output couplings to $\mu_3$ are reversed and the phase of $\beta_{12}$ then reversed. More specifically, the primary winding of an output transformer 35 has been divided and the plate battery 32 connected between the division point of the transformer winding and the grounded junction of $\beta_1$ and $\beta_2$, the latter being connected in series with each other between the respective cathodes of V1 and V2. In channel 12 the input circuit is returned to ground; in channel 13 the input circuit is returned to the high-potential side of $\beta_1$, that is, in Figs. 9 and 11, to the cathode of V1. It may be noted that the circuits shown in Figs. 9 to 11 are not true push-pull circuits inasmuch as they are unbalanced on the input side and the intermediate stages are true separate channels. The output transformer in each case may be balanced for steady direct current, however, just as in a push-pull circuit. It may be noted, also, that the feedback voltages appearing across $\beta_1$ and $\beta_2$ are derived from their respectively corresponding channels and that these voltages are combined in series in the input circuit of channel 13. In short, these circuits conform with the prototype shown in Fig. 2.

Figure 12:
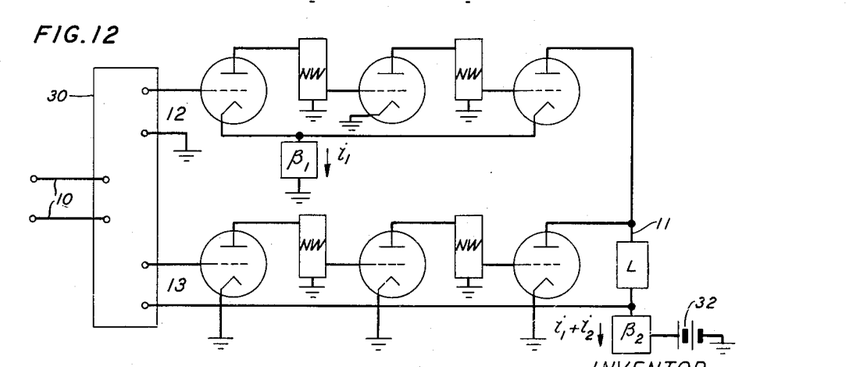

In Fig. 12 the upper channel includes a cathode feedback amplifier essentially as in Fig. 8; and the lower channel includes a three-stage series feedback amplifier in which all three cathodes are grounded and the associated input transformer winding is returned to the high potential side of $\beta_2$, the latter being interposed between the load and the plate battery 32. Anode signal current for the first stage in channel 12 is confined to a mesh which does not include $\beta_2$. Therefore the feedback voltage generated in $\beta_2$ does not contain any contribution from the first stage of channel 12. Thus the parasitic coupling mentioned in connection with Figs. 7 and 8 is eliminated.

Figure 13:
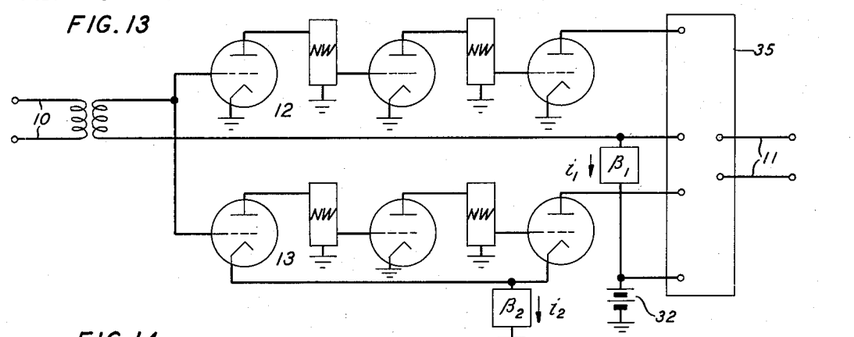

Many of the circuits disclosed herein are amenable to an "input-output inversion" whereby embodiments conforming with Fig. 2 may be transformed into embodiments conforming with Fig. 3 and vice versa. In general in approaching such a transformation one may regard the input grid of each channel as the output plate of the channel, similarly regard the output plate of each channel as the input grid, and effect the indicated circuit changes accordingly. To conform to the notation of Figs. 2 and 3 the subscripts on the $\beta$ networks should then be interchanged, and, of course, the roles of the input and output circuits of the system are interchanged. The circuit shown in Fig 13 is the result of an input-output inversion of Fig. 12. Consistently with the prescribed change in subscripts the series feedback amplifier of Fig. 12 is shown in Fig. 13 in the upper channel 12 and the cathode feedback amplifier appears in the lower channel 13. The two $\beta$ networks, with interchanged subscripts, occupy the same position relative to each other and to the divided transformer windings in Fig. 13 as they do in Fig. 12. It will be observed, however, that the two $\beta$ networks now appear in series with each other in the input circuit of the lower channel and that the circuit otherwise, too, conforms with Fig. 2.

Although a similar inversion may be performed on Figs. 6 to 11 the resulting systems all require separate plate supplies for the two output tubes, i. e., separate at signal frequencies. This is true in Figs. 6 to 8 because the two input meshes of any configuration possess no common branch and hence when they are inverted to output meshes there is no branch available for a common battery. In Figs. 9 to 11 the input meshes contain a common branch but in this branch the cathode emission currents are opposed. In Fig. 12, however, the two input meshes contain a common branch properly oriented, namely part of the ground return. When this circuit is inverted, therefore, there is a place, as shown in Fig. 13, to insert a common plate battery 32.

Figure 14:
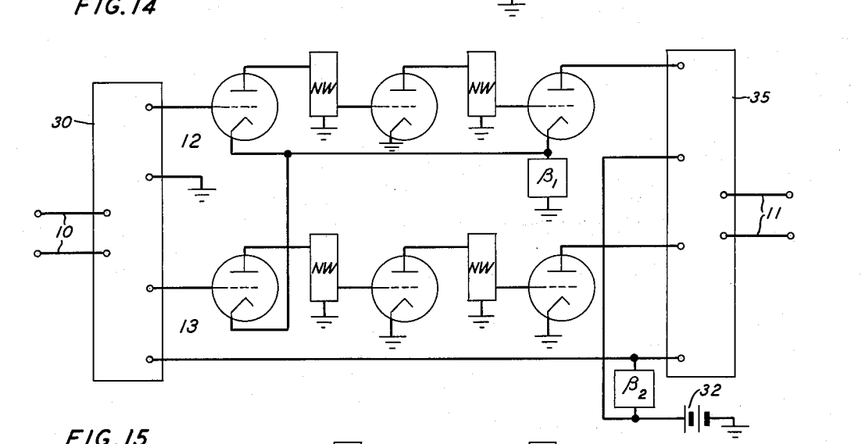

An embodiment of Fig. 2 that uses split transformers on both input and output sides of the system is illustrated in Fig. 14. The three-stage amplifier in the upper channel is of the cathode feedback type, as in Fig. 12. The amplifier in the lower channel is similar to the three-stage series feedback amplifier of Fig. 12, except that the cathode in the first stage is connected to the high potential side of $\beta_1$ in the upper channel. In effecting an input-output inversion of this circuit the connections made to the cathodes of the input and output stages in the lower channel are interchanged.

In embodiments of Fig. 1 in which a separate circuit is provided for $\beta_{12}$ two points may be noted: (a) The $\beta_{12}$ transmission in no way influences the stability of the system. This implies in particular that the transmission properties of $\beta_{12}$ need be specified only over the frequency pass band of the amplifier. Such elements of questionable behavior as transformers and vacuum tubes could be used therefore in $\beta_{12}$ whereas their presence in a feedback loop would be intolerable. (b) A failure of the $\beta_{12}$ path to transmit, as might occur upon failure of a vacuum tube in the $\beta_{12}$ path, need not completely disrupt the system. If the failure of $\beta_{12}$ does not destroy any of the unilateral adders or junctions in Fig. 1, then the failure simply converts the system into two ordinary feedback amplifiers in parallel. There results a gain increase of approximately six decibels and a reduction by half of the feedback in decibels.

Figure 15:
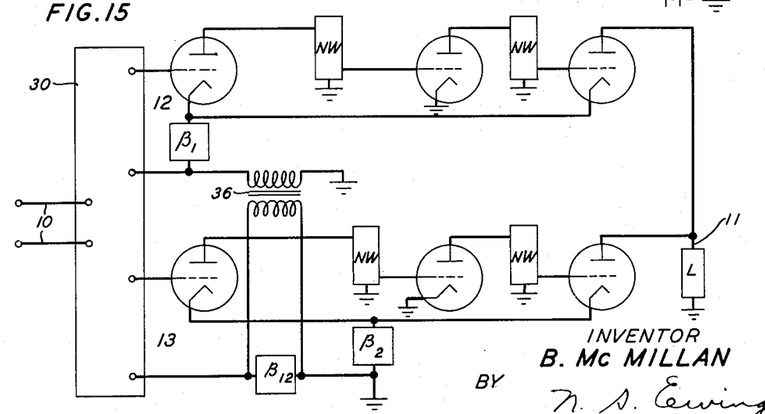
Fig. 15 illustrates an embodiment in which a separate cross feedback connection is provided.

The possibility (a) mentioned in the paragraph next preceding is exploited in the circuit shown in Fig. 15. This circuit comprises two cathode feedback amplifiers with provision for injecting feedback current from the upper channel into the input circuit of the lower channel. Specifically, one winding of a unity ratio transformer 36 is interposed in the connection between ground and the low potential side of $\beta_1$, the other winding being connected across a $\beta_{12}$ network that is interposed in the connection between ground and the input transformer winding of the lower channel. This circuit is amenable to input-output inversion and also to the reversal of phase in the lower channel described with reference to Figs. 9 to 11. In the latter case the phase relations are such that the transformer may be omitted from the cross feedback connection in favor of a direct connection.

The circuits described with reference to Figs. 6 to 15 have all depended upon input and output meshes of high impedance for the unilateral couplings indicated in Figs. 1, and 2 and 3. At the expense of power, unilateral couplings can be achieved also by balancing methods as, for example, by the use of hybrid coils or the like. An embodiment of the invention conforming with Fig. 2 and utilizing hybrid coils is shown diagramatically in Fig. 16.

Figure 16:
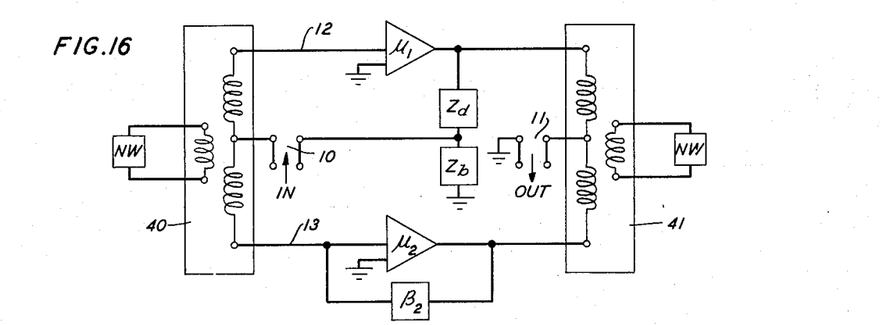

In Fig. 16 hybrid coils 40 and 41 are employed on the input and output sides, respectively, of the two-channel amplifying system. Each of the hybrid coils comprises three coupled windings of which two are joined in series with each other and the third is coupled to the usual balancing network, the latter being designed to match the impedance presented by the common branch of the circuit. The common branch for hybrid coil 41 consists simply of the common output circuit 11 which is connected between the junction of the series connected windings and ground. The common branch associated with the input hybrid 40 can be traced from ground through a two-terminal impedance network $Z_b$ and the common input circuit 10 to the junction of the series-connected windings. The high potential ends of the latter are connected through channels 12 and 13, respectively, to the inputs of amplifying elements $\mu_1$ and $\mu_2$, and the outputs of the latter are associated similarly with hybrid coil 41. A second two-terminal impedance network $Z_a$ is connected from the high potential side of the output circuit of $\mu_1$ to the ungrounded side of $Z_b$ so that the coupling to the common input branch is $Z_b/(Z_a+Z_b)$.

The common input branch in Fig. 16 is coupled equally to the inputs of $\mu_1$ and $\mu_2$ through the hybrid coil 40, and these two inputs are maintained in conjugate, or decoupled, relation to each other. The common output branch and the outputs of $\mu_1$ and $\mu_2$ are related to each other in the same manner by virtue of the properties of hybrid coil 41.

It will be observed that in Fig. 16 the feedback from the output of $\mu_1$ passes through a closed $\mu_1\beta_1$ loop, including $Z_b$ and the upper hybrid coil winding to the input of $\mu_1$, and that it passes also through the lower hybrid winding to the input of $\mu_2$ where it is combined with the feedback $\beta_2$ from the output of $\mu_2$. In these respects then, the Fig. 16 circuit conforms with Fig. 2. To maintain equality of the effective gains of the two channels the pair of coupling impedances should be designed to offset the reduction in effective gain of channel 13 due to the input hybrid coil. It can be readily ascertained also that the conjugacies indicated in Fig. 2 obtain in the Fig. 16 circuit by virtue of the described conjugacies afforded by the hybrid coils.

Figure 17:
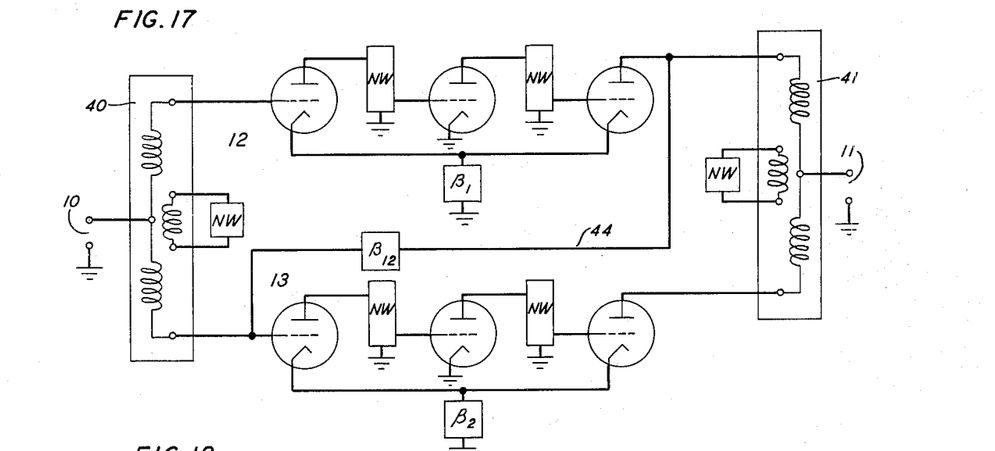

In the circuit of Fig. 16 and also in its analog corresponding to Fig. 3 (in which $Z_b$ appears in the common output branch instead of the common input branch) one of the hybrid coils appears in a feedback circuit. This may be a disadvantage in some cases because stability of the loop requires that the feedback phase must be maintained over a much wider band than that used for transmission and this is often difficult in circuits containing transformers. In Fig. 17 the hybrid coils appear only in the cross feedback path $\beta_{12}$ and there in not so critical a way.

Referring to Fig. 17, input and output hybrid coils 40 and 41 are associated with the two channels 12 and 13 in substantially the manner described with reference to Fig. 16. In this case the amplifying elements are cathode feedback amplifiers, each with its respective feedback coupling impedance $\beta_1$, $\beta_2$, and the cross feedback coupling is provided by a shunt feedback connection 44 from the output of $\mu_1$ to the input of $\mu_2$. Although one of the hybrid coils in Fig. 17 may be omitted, as will be evident from Fig. 18, it is the presence of both hybrids in Fig. 17 that permits the use of the shunt feedback connection 44. In the absence of conjugacy between the outputs of $\mu_1$ and $\mu_2$, of course, connection 44 would supply feedback from the outputs of both of the amplifiers and not from one of them alone, as desired. The hybrid coils then may be looked upon as providing separation of the two amplifier output circuit meshes and separation likewise of the input circuit meshes, without necessarily affecting the operation of the circuit in any other way. This same splitting of input and output meshes with the aid of hybrid coils can be realized readily in any of the circuits of Figs. 6 to 14 without requiring any change of the form, whether series or shunt, of the feedback paths and without introducing hybrid coils into these paths.

Figure 18:
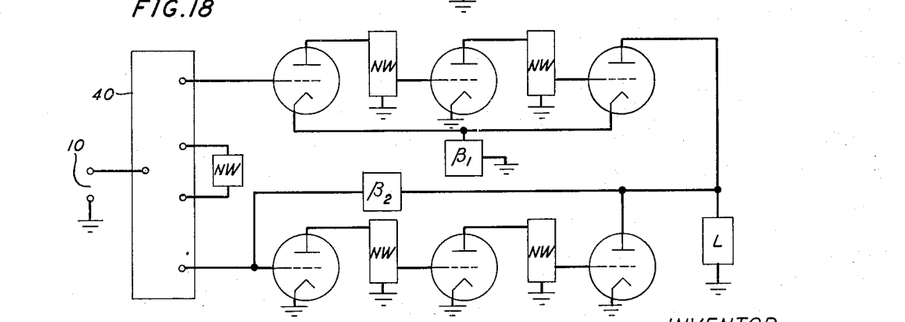

The two-channel amplifying system shown in Fig. 18 represents a simplification of the Fig. 17 system in that the output hybrid coil is omitted and also the distinct $\beta_{12}$ feedback connection. The amplifier in the upper channel 12 is of the cathode feedback type while that in the lower channel 13 is an ordinary three-stage amplifier (all cathodes grounded) with a shunt feedback connection $\beta_2$. The outputs of the two amplifiers are connected in parallel with each other, and hence what is fed back through $\beta_2$ to the input of $\mu_2$ is derived from the outputs of both channels as in the prototype in Fig. 3. While the relative impedances of the elements in the output mesh in the upper channel are relied upon to provide the desired conjugacy between the output of $\mu_2$ and the input of $\mu_1$, the input hybrid coil 40 provides the conjugacies that are desired on the input side of the system.

The Fig. 18 system is subject to the input-output inversion previously described. Wherever plates or grids appear in parallel with each other (as do the plates in Fig. 18) the meshes of the parallel elements can be split by means of a hybrid coil as they are in Fig. 17. This technique is applicable to the circuits shown in Figs. 6, 7, 8, 12, 13, 14 and 15, and also to their input-output inversions. In Figs. 6, 7, 8, 12, 13 and 14 the common branch of the meshes to be split contains a $\beta$ circuit in series with the common input or output circuit and in each such case the balancing network should match the total impedance presented by the common branch.

Figure 19:
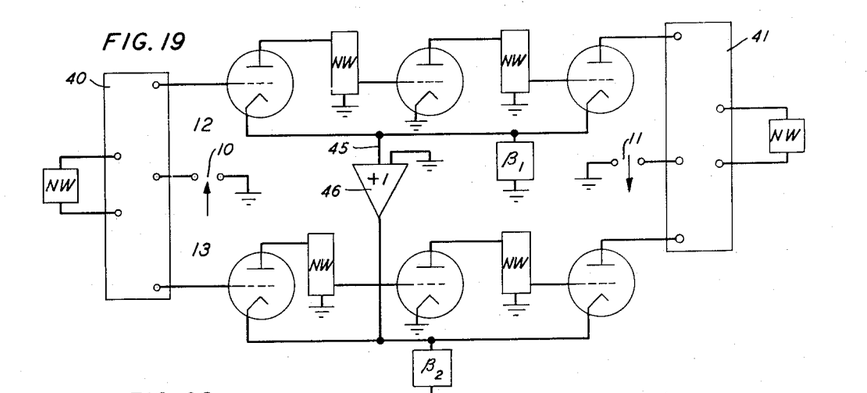

A further embodiment of the Fig. 1 prototype is illustrated in Fig. 19, wherein a separate connection is provided for $\beta_{12}$. The system shown conforms with Fig. 17 with the $\beta_{12}$ network and connection 44 replaced by a cross connection 45 that includes a unity-gain amplifier 46 the input circuit of which is connected across $\beta_1$ and its output circuit across $\beta_2$. In this case the amplifier injects in $\beta_2$ a current exactly equal to that in $\beta_1$. Study of the circuit will show that the current-carrying capacity of the cross-coupling amplifier 46 must be superior to that of the amplifier in the upper channel 12. The voltage level at which the former operates is much lower, however. The gain stabilization of the cross-coupling must be roughly twice as great as that of either of the amplifying channels. Finally, this gain stabilization must be accomplished without introducing any sensible amount of backward transmission from $\beta_2$ to $\beta_1$.

In the foregoing description of Fig. 19 it has been assumed that there is no phase reversal in the cross connection 45. If there is such a reversal, then at each hybrid coil the common input and output circuits should be interchanged in position with their associated balancing networks. This would have the advantage that the common input and output circuits are brought in at points convenient for impedance match. This same advantage appears in the output circuits of the systems shown in Figs. 9, 10, and 11. Here the output meshes can be split simply by inserting balancing networks in series with the plate battery. Similar considerations apply to the input circuits of the input-output inversions of Figs. 9, 10 and 11.

In Figs. 6 to 15 where one side of a transformer comprises two split windings, and not a single tapped winding, there are two meshes coupled inductively to a common impedance (presented by the third winding) and possessing no common branch in which the mesh currents are phased oppositely to their phasing in the common impedance. The desired conjugacy of the meshes in this case can be achieved by introducing a shaped mutual coupling (provided by additional windings and connected network, for example) to balance against the coupling through the common impedance.

In addition to the feedback couplings described with reference to Fig. 1 there are other couplings often present which in many applications of the invention may be disregarded. In some applications, however, the circuit designer may wish to take account of them. In the systems of Figs. 6 to 15, for example, there are cross couplings caused by the cathode currents of the tubes in the input stages and mention has already been made of these. Two other cross couplings are also present:

(a) The output current of $\mu_2$ divided between the load and the output admittance of $\mu_1$. That portion leaking through the latter branch creates a feedback voltage across $\beta_1$ in addition to the desired voltage created by the output current of $\mu_1$. Hence, there is a coupling from the output of $\mu_2$ to the input of $\mu_1$ which can be symbolized by a cross connection $\beta_{21}$. The latter is shown in dotted lines in Fig. 1. Although there is a similar coupling from $\mu_1$ this represents an increment to $\beta_{12}$ and does not complicate the stability problem.

(b) The $\beta_2$ feedback creates a circulating current in the input mesh of $\mu_2$ which divides between the common input circuit and the input admittance of $\mu_1$, and there is again a coupling $\beta_{21}$ from the output of $\mu_2$ to the input of $\mu_1$. (Where reference is made in this paragraph and the one next preceding to "common input circuit load" it is to be understood that either of the latter may also include a $\beta$ circuit in series.)

If one attempts to increase indefinitely the bandwidth of a system in accordance with the invention, a point may be reached where the input and output admittances of $\mu_1$ can not be neglected, in the sense that the $\beta_{21}$ coupling treated above, becomes a threat to stability, or at least must be included in the stability analysis. At that point the designer may find it expedient to introduce hybrid coils or the like so that the effect of coupling $\beta_{21}$ can be disregarded. The hybrid coils so applied to Figs. 6 to 15 serve primarily to balance out $\beta_{21}$.

Taking advantage of the division of $\beta_{21}$ into the two components (a) and (b) above, one may balance out $\beta_{21}$ by using only one hybrid coil. One overcompensates say, the plate circuit leakage (a) so that the resulting coupling through $\beta_1$ to the input mesh of $\mu_1$ cancels the otherwise uncompensated coupling (b). Specifically, and with reference to Fig. 18, this compensation would be provided by a change in the balancing network of the hybrid coil 40. This network would be designed not to produce exact conjugacy between the two input grids, but rather to provide an effective coupling between them which balances the undesired $\beta_{21}$ coupling above mentioned.

In the general case the several channels in a given system embodying the invention may differ in respect of the number of amplifier stages. The relative phase shifts through the normal channels must be considered, of course, and if the phase shifts in two channels are opposed, for example, one has to invert the phase of one channel relative to the other at one end.

Figure 20:
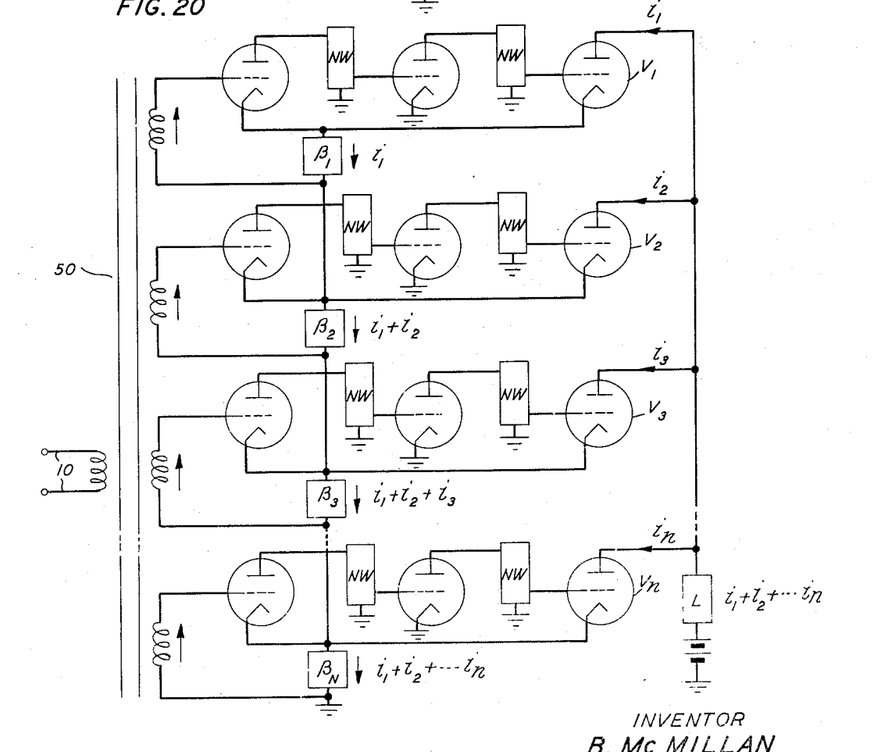
Fig. 20 illustrates a modification of Fig. 8 in which more than two channels are employed.

The principles involved in extending a system in which there are two channels to one in which N is greater than two have been set forth hereinbefore and illustrated in Figs. 4 and 5. One further, specific example of such an extension is represented in Fig. 20. The system illustrated here comprises N cathode feedback amplifiers arranged, as in the two-channel system of Fig. 8, with their inputs connected to respective secondary windings of an input transformer 50, with the anodes of their respective output tubes V1, V2 . . . Vn connected in parallel to the load, and with their respective feedback coupling impedances $\beta_1$, $\beta_2$ . . . $\beta_n$ connected in series with each other to ground. The system is subject to the previously described input-output inversion.

The output current of V1 (disregarding the direct- current component) flows through all of the impedances $\beta_1$, $\beta_2$, etc. and thereby develops across each a voltage that appears as a feedback voltage in the input circuit of its respectively corresponding amplifier. Thus, in addition to the negative feedback $\beta_1$ from output to input of the uppermost, or first, channel there is a respective cross feedback $\beta_2$, $\beta_3$ etc. from the output of the first channel to the input of each of the other channels. The output current of V2 flows through $\beta_2$, $\beta_3$ . . . $\beta_N$, but not through $\beta_1$, and it results accordingly in negative feedback in the second channel and cross feedback to each of the channels that follow the second in the succession of channels. So also for any channel, including the N$^{th}$, one can identify a $\mu\beta$ loop individual to the channel and cross feedback paths from the output of that channel to the input of any channel following it in the succession, or (to restate the last observation) cross feedback paths to the input of that channel from the outputs of any channel preceding it in the succession.

The first channel in Fig. 20 is the main signal-carrying channel. The net signal input in that channel is reduced by negative feedback $i_1\beta_1$, of course, but in the second channel there is a two-fold reduction. Here, there is a first reduction represented by $i_1\beta_2$, and a second due to $i_2\beta_2$. (Note that the signal component of $i_2$ is much smaller than that of $i_1$.) In succeeding channels there is a corresponding further reduction in the net signal input and therefore also in the contribution of those channels to the total signal output of the system.

Signal modulation, which is due largely to the relatively heavily loaded main channel, is reflected in the feedback currents and principally in $i_1$. These currents produce voltages in the input circuits so phased as to reduce the currents that give rise to them, thereby substantially reducing the signal modulation appearing in the common output circuit or load. Noise and other unwanted effects are reduced in substantially the same way.

The conjugacies described with reference to Fig. 5 are substantially realized in Fig. 20 by virtue of the fact that the impedance of the load and of each $\beta$ is many times smaller than the impedances of the meshes in which they are incorporated. Improved conjugacy can be obtained, if necessary, by the use of hybrid connections or other techniques described herein with reference to other embodiments.

What is claimed is:

1. A signal translating system comprising a plurality of signal translating channels connected in multiple with each other between a common signal source and a common load, an individual independent feedback loop embracing each of said channels, a cross feedback connection from the output of one of said channels to the input of another, and means in each channel for confining the energy transfer between channels to energy so transferred by said cross feedback connection.

2. A signal translating system comprising a plurality of wave translating channels connected in multiple with each other between a common source and a common load, each of said channels including a forward or $\mu$-portion and a negative feedback or $\beta$-portion forming individual independent feedback loop wherein $\mu\beta \gg 1$, considering said channels in a predetermined sequence, negative feedback means cross connecting each of said channels to any said channel following it in said sequence and to such channel or channels exclusively, and means in each of said channels for combining energy from the said $\beta$-portion for such channel and from said common source with energy from said negative feedback cross connecting means, exclusively, and applying such combined energy to the said $\mu$-portion for such channel.

3. A system in accordance with claim 2 in which the feedback transmission of said negative feedback cross connecting means is substantially equal to the feedback transmission of said $\beta$-portions.

4. A signal translating system comprising two wave amplifying elements connected in multiple with each other between a common signal source and a common load, connections to feed back from the output of one only of said elements to the input only thereof and also from the outputs of both of said elements to the input of the other only of said elements, and means connected to the input of each of said elements for attenuating energy transfer between said elements except such energy as is transmitted therebetween by said connection feeding back from outputs of both said elements.

5. A signal translating system comprising two wave amplifying elements connected in multiple with each other between a common signal source and a common load, a first feedback connection extending from output to input of one only of said amplifying elements, a second feedback connection extending from the output of the other only of said amplifying elements to the inputs of both, and means connected to the input of each of said amplifying elements for attenuating energy transfer between said elements except energy transmitted therebetween by said second feedback connection.

6. A signal translating system comprising two wave amplifying elements connected in multiple with each other between a common signal source and a common load, a first feedback connection extending from output to input of one only of said amplifying elements, and a second feedback connection extending to the input of the other of said amplifying elements from the outputs of both, and means for confining energy in said first feedback connection to said one only of said amplifying elements.

7. A signal translating system comprising two wave amplifying elements, a signal source connected to the inputs of both said elements, a load, the outputs of both said elements being connected to said load and in substantially conjugate relation to each other, respective feedback connections from the output of each of said element to the input thereof, a cross feedback connection from the output of one of said elements to the input of the other, and means connected to the inputs of each of said elements for combining energy from said signal source with energy from said respective feedback connections to such input, exclusively, and for applying such combined energy to such element.

8. A signal translating system having a common signal input portion and a common signal output portion coupled by multipled wave translating elements that have amplifying properties, each of said translating elements having individual input and output portions, a feedback connection extending between the individual input and output portions of a first of said elements and another feedback connection extending between said individual input and output portions of said second element and including one of said common portions, whereby said other feedback connection provides feedback around said second element and cross feedback from one of said elements to the other, and means for applying to each of said translating elements only energy from said common signal input portion and energy from said feedback connections to the said individual input portion of such translating element.

9. A system in accordance with claim 8 in which the feedback connection to the individual input portion of the element that receives said cross feedback is substantially conjugate to the individual input portion of the other of said elements.

10. A system in accordance with claim 9 in which said individual output portions are substantially conjugate.

11. A system in accordance with claim 8 in which $|\mu\beta|\gg 1$ in each of the feedback loops formed by said elements and feedback connections, and in which the respective $\beta$'s are equal.

12. A signal translating system having a common signal input portion and a common signal output portion coupled by multipled wave translating elements that have amplifying properties, each of said translating elements having individual input and output portions, a feedback connection extending from the individual output portion of one of said elements to said common input portion, and a second feedback connection from the individual output portion of the other of said elements to the individual input portion thereof, and means for applying to each of said translating elements only energy from said common signal input portion and energy from said feedback connections to the said individual input portion of such translating element.

13. A system in accordance with claim 20 in which said coupling impedances are disposed in series in the said circuits in which they are included, and in which the value of each said impedance is many times smaller than the total impedance of each said circuit.

14. A signal translating system including two electric wave amplifiers having individual input circuits joined to a common input circuit and individual output circuits joined to a common output circuit, a negative feedback connection from the individual output circuit of one of said amplifiers to the individual input circuit thereof, a negative feedback connection from another of said output circuits to another of said input circuits, and a coupler at at least one of the junctions of said individual and common circuits providing conjugacy between the individual output circuit of one of said amplifiers and the individual input circuit of the other.

15. An electric signal amplifying system comprising two wave amplifying elements both adapted for the same signal frequency range connected in multiple with each other between signal input and signal output circuits that have portions individual to the respective amplifying elements and portions common thereto, two negative feedback circuits having like transmission characteristics over the same said frequency range, a first of said feedback circuits connecting only the individual portions of the input and output circuits of a first of said amplifying elements, and forming with said first element a first independent feedback loop, the second of said feedback circuits connecting one of the said individual circuit portions of the second of said amplifying elements and one of said common circuit portions to form with said second element a second independent feedback loop and to provide cross feedback from one of said amplifying elements to the other.

16. An electric signal amplifying system comprising two wave amplifying elements both adapted for the same signal frequency range connected in multiple with each other between signal input and signal output circuits that have portions individual to the respective amplifying elements and portions common thereto, two negative feedback circuits having like transmission characteristics over the same said frequency range, a first of said feedback circuits connecting only the individual portions of the input and output circuits of a first of said amplifying elements and forming with said first element a first independent feedback loop, the second of said feedback circuits connecting the individual input circuit portion of the second of said amplifying elements and said common output circuit portion to form with said second element a second independent feedback loop and to provide cross feedback from said first amplifying element to said second amplifying element.

17. A system in accordance with claim 16 in which said negative feedback circuits comprise respective coupling impedances each included in series in a respective individual input circuit portion, the said coupling impedance that comprises said first feedback circuit being included in series in said output circuit exclusively in the portion individual to said first amplifying element, and the other of said coupling impedances being included in series in the common portion of said output circuit.

18. A signal translating system comprising a plurality of one-way amplifying elements connected in multiple with each other between a common input junction and a common output junction, each of said amplifying elements being embraced by a respective negative feedback path forming therewith an individual independent feedback loop, negative feedback means cross connecting the output of one of said amplifying elements to the input of each other of said elements, said feedback paths and negative feedback means having similar feedback transmission characteristics over the frequency band occupied by the signal to be translated, and means connected to the input of each of said elements, for limiting the energy which is coupled to such input to the energy from said negative feedback means respectively connected to such input and from said common input junction.

19. A signal translating system having a common signal input portion and common signal output portion coupled by multipled wave translating elements that have amplifying properties, each of said translating elements having individual input and output portions, a feedback connection extending from the individual output portion of one of said elements to the individual input portion thereof and forming with said one element a first independent feedback loop, a second feedback connection extending from said common output portion to the individual input portion of the other of said elements and forming with said other element a second independent feedback loop, and means for applying to each of said translating elements only energy from said common signal input portion and energy from said feedback connections to the said individual input portion of such translating element.

20. In a signal translating system, a common signal input circuit, a common signal output circuit, a plurality of electric wave amplifiers, a first set of individual amplifier coupling circuits comprising an input circuit individual to each said amplifier and connecting each amplifier in signal translating relation to said common input circuit, a second set of individual amplifier coupling circuits comprising an output circuit indivdual to each said amplifier and connecting each amplifier in signal translating relation to said common output circuit, a corresponding plurality of negative feedback coupling impedances individual to the several said amplifiers, means connecting to each of the said coupling circuits in one of said sets the said negative feedback coupling impedances individual to the corresponding amplifier, exclusively, and means connecting to each of the said coupling circuits in the other of said sets the negative feedback coupling impedances individual to the corresponding amplifier and any coupling impedances for an amplifier following such corresponding amplifier in a predetermined sequence.

21. A signal translating system comprising a pair of one-way amplifying elements, means connecting said amplifying elements in multiple between a common signal source and a common load, means defining a local feedback path for a first of said amplifying elements, means defining both a local feedback path for a second of said amplifying elements and a cross-connecting feedback path between the output of one of said amplifying elements and the input of the other of said amplifying elements and means for confining energy in said first-named local feedback path to said first amplifying element.

22. In a signal translating system as recited in claim 21 a third one-way amplifying element, means connecting said third element in multiple with said pair of elements between said common signal source and said common load, means defining both a local feedback path for said third amplifying element and a cross-connecting feedback path between said third element and said pair of elements, and said means connecting said amplifying elements to said common load including means connecting the outputs of said amplifying elements in conjugate relation with one another with respect to said common load.

References Cited in the file of this patent

UNITED STATES PATENTS

| | | |
|---|---|---|
| 2,043,587 | Macalpine | June 9, 1936 |
| 2,173,427 | Scott | Sept. 19, 1939 |
| 2,210,503 | Shaw | Aug. 6, 1940 |
| 2,281,238 | Greenwood | Apr. 28, 1942 |
| 2,370,483 | Muffly | Feb. 27, 1945 |
| 2,379,513 | Fisher | July 3, 1945 |
| 2,479,772 | Peterson | Aug. 23, 1949 |
| 2,536,651 | Merhaut | Jan. 2, 1951 |
| 2,547,662 | Rich | Apr. 3, 1951 |
| 2,624,796 | Saunders | Jan. 6, 1953 |

FOREIGN PATENTS

| | | |
|---|---|---|
| 111,828 | Australia | Oct. 28, 1940 |
| 211,374 | Switzerland | Dec. 2, 1940 |
| 863,192 | France | Dec. 23, 1940 |